United States Patent
Koshizuka et al.

[11] Patent Number: 5,215,810
[45] Date of Patent: Jun. 1, 1993

[54] THERMAL TRANSFER RECORDING MEDIUM

[75] Inventors: Kunihiro Koshizuka; Shigeru Mano; Tatsuichi Maehashi; Takao Abe, all of Hino, Japan

[73] Assignee: Konica Corporation, Tokyo, Japan

[21] Appl. No.: 682,135

[22] Filed: Apr. 8, 1991

[30] Foreign Application Priority Data
  Apr. 10, 1990 [JP] Japan .................... 2-94553

[51] Int. Cl.⁵ .............................................. B32B 9/00
[52] U.S. Cl. .................................... 428/195; 428/327; 428/339; 428/488.1; 428/488.4; 428/913; 428/914
[58] Field of Search .................. 428/195, 488.4, 913, 428/212, 339, 206, 327, 336, 484, 488.1, 914

[56] References Cited
U.S. PATENT DOCUMENTS

| | | | |
|---|---|---|---|
| 4,774,128 | 9/1988 | Koshizuka et al. | 428/195 |
| 5,075,170 | 12/1991 | Matsushita et al. | 428/195 |
| 5,120,383 | 6/1992 | Takei et al. | 428/195 |

*Primary Examiner*—Patrick J. Ryan
*Assistant Examiner*—W. Krynski
*Attorney, Agent, or Firm*—Jordan B. Bierman

[57] ABSTRACT

A thermal transfer recording medium suitable for multiple setting is disclosed. The recording medium comprises a support and a plurality of heat softening colorant layer provided on said support, and a porous or island-like resin layer having a softning point higher than that of said heat softning colorant layers or having no softning point interposed between said heat softning colorant layers.

6 Claims, 1 Drawing Sheet

THERMAL TRANSFER RECORDING MEDIUM

FIELD OF THE INVENTION

The present invention relates to a thermal transfer recording medium capable of multiple setting, more specifically to a thermal transfer recording medium which offers ghost-free distinct printing images even in multiple setting.

BACKGROUND OF THE INVENTION

The use of thermal transfer recording media such as thermal transfer ink ribbons has expanded as word processors, facsimiles, bar codes, etc. have become common.

However, most of them are of single use, thus posing a problem of high cost.

As a solution to this problem, there have been proposed thermal transfer recording media capable of multiple setting.

Traditionally, as thermal transfer recording media capable of multiple setting, there have been reported, for example, thermal transfer recording media of the so-called cohesive failure type such as described in Japanese Patent Publication Open to Public Inspection No. 36698/1982 which comprises a single relatively thick ink layer formed on the support via a resin layer, which ink layer upon setting is part by part consumed in each transfer, whereby multiple setting is possible, thermal transfer recording media of the so-called ooze out type such as described in Japanese Patent O.P.I. Publication No. 68235/1979 which has an ink layer comprising a polymeric porous material and a thermofusible ink contained therein, which thermofusible ink upon setting oozes out little by little from the polymeric porous material, whereby multiple setting is possible, and thermal transfer recording media of the so-called stone wall type such as described in Japanese Patent O.P.I. Publication No. 160691/1982 which has an ink layer comprising fine grains of packing material and thermofusible ink, which fine grains of packing material upon setting control the ink transfer amount in each setting, whereby multiple setting is possible.

However, none of these types of thermal transfer recording media is free of the ghost phenomenon, wherein density unevenness, blurs and other setting failures associated with the preceding setting occur on the printing surface in the second setting and thereafter.

In the case of thermal transfer recording media of the coagulation disruption type, the ghost phenomenon is attributable to pressure transfer, upon re-setting, of the minute ruggedness formed on the ink layer after the first setting.

The ghost phenomena found in thermal transfer recording media of the leak type and those of the stone fence type are attributable to similar causes.

Furthermore, such a thermal transfer recording medium for multiple setting has a drawback that its ink layer is sensitive to temperature changes; for example, when it is used at high temperature, its service life by number of settings decreases because of the increase in the ink transfer amount per setting.

On the other hand, when it is used at low temperature, the density of the printing images obtained is significantly low because of the decrease in the ink transfer amount per setting.

SUMMARY OF THE INVENTION

The object of the present invention is to provide a thermal transfer recording medium which permits the obtainment of ghost-free distinct printing images even in multiple setting, which ensures stable service life by number of settings with less influence of temperature changes on the service life by number of settings or on the density of printing images obtained, which offers high density printing images and which is easy to produce because of the simple structure.

To solve the problems described above, the present invention comprises a thermal transfer recording medium having a plurality of heat softening colorant layers on the support and a porous or island-like resin layer having a softening point higher than that of the heat softening colorant layers or having no softening point formed between the heat softening colorant layers described above.

DETAILED DESCRIPTION OF THE INVENTION

Figure 1:
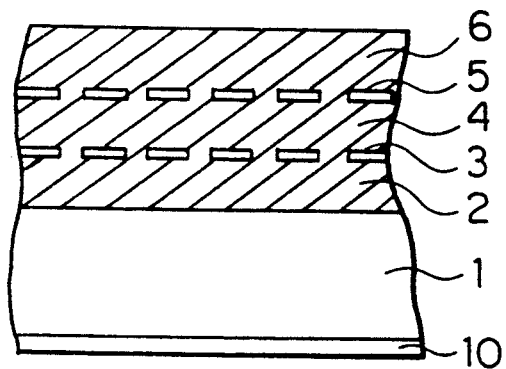
FIGS. 1 and 2 are cross-sectional views of the thermal transfer recording medium of the present invention.

The thermal transfer recording medium of the invention has a plurality of heat softening colorant layers formed on the support a resin layer interposed between the heat softening colorant layers.

The heat softening colorant layers, the resin layer and the support are described in this order below.

Heat softening colorant layer

A heat softening colorant layer contains a colorant, a thermofusible substance and a thermoplastic substance as the main components.

Examples of the colorant include inorganic pigments, organic pigments and dyes.

Examples of the inorganic pigment include titanium dioxide, carbon black, zinc oxide, Prussian blue, cadmium sulfide, iron oxide and chromates of lead, zinc, barium or calcium.

Examples of the organic pigment include azo pigments, thioindigo pigments, anthraquinone pigments, anthanthrone pigments, triphenodioxazine pigments, vat dye pigments, phthalocyanine pigments such as copper phthalocyanine and its derivatives and quinacridone pigments.

Examples of the dye include acid dyes, direct dyes, dispersion dyes, oil-soluble dyes and metal-containing oil-soluble dyes.

The content of the colorant described above in the heat softening colorant layer is normally between 5 and 35% by weight, preferably between 10 and 25% by weight.

Examples of the thermofusible substance described above include vegetable waxes such as carnauba wax, Japan wax, ouricury wax and esparto wax; animal waxes such as beeswax, insect wax, shellac and whale wax; petroleum waxes such as paraffin wax, microcrystalline wax, polyethylene wax, ester wax and acid wax; and mineral waxes such as montan wax, ozokerite and ceresine, as well as higher fatty acids such as palmitic acid, stearic acid, margaric acid and behenic acid;

higher alcohols such as palmityl alcohol, stearyl alcohol, behenyl alcohol, marganyl alcohol, myricyl alcohol and eicosanol; esters of higher fatty acid such as cetyl palmitate, myricyl palmitate, cetyl stearate and myricyl stearate; amides such as acetamide, propionamide, palmitamide, stearamide and amide wax; and higher amines such as stearyl amine, behenyl amine and palmitin amine.

These thermofusible substances may be used singly or in combination of two or more kinds.

The content of the thermofusible substance in a heat softening colorant layer is normally between 10 and 95% by weight, preferably between 20 and 70% by weight.

Examples of the thermoplastic resin described above include ethylene copolymers, polyamide resins, polyether resins, polyurethane resins, polyolefin resins, acrylic resins, vinyl chloride resins, cellulose resins, rosin resins, ionomer resins and petroleum resins; elastomers such as natural rubber, styrene-butadiene rubber, isoprene rubber, chloroprene rubber and diene copolymers; rosin derivatives such as ester gum, rosin maleics, rosin-phenolics and hydrogenated rosin; and polymer compounds having a softening point of 50 to 150° C. such as phenol resins, terpene resins, cyclopentadiene resins and aromatic hydrocarbon resins.

These thermoplastic resins may be used singly or in combination of two or more kinds.

The content of the thermoplastic resin in a heat softening colorant layer is normally between 0 and 50% by weight, preferably between 5 and 30% by weight.

The heat softening colorant layer may contain inorganic or organic fine particles such as those of metals or silica gel or an oil such as linseed oil or mineral oil, as long as it does not interfere with the accomplishment of the object of the invention.

The fusing viscosity of a heat softening colorant layer having such a composition is normally 20 to 5000 cp, preferably 50 to 3000 cp at 100° C., though it cannot be generally specified, depending on the kind of the heat softening substance used and the content of the heat softening substance and the content of the additive if it is contained.

Resin layer

A key to the thermal transfer recording medium of the invention is that a porous or island-like resin layer having a softening point higher than that of the heat softening colorant layers (hereinafter referred to as high softening point resin layer) or a resin layer having no softening point (hereinafter referred to as non-softening resin layer) is interposed between the heat softening colorant layers.

The high softening point resin layer comprises one or more materials, and its overall softening point is higher than that of the heat softening colorant layers described above.

The softening point of the heat softening colorant layers is normally 60 to 90° C.

Therefore, the softening point of the high softening point resin layer described above for the present invention normally exceeds 70° C.

Examples of materials preferably used for forming the high softening point resin layer include polyamide resins such as Sunmide 611, product of Sanwa Chemical Industry Co., Ltd., with a softening point of 110° C., ethylene-acrylic acid copolymers such as Zaikthene, product of Sumitomo Chemical Co., Ltd., with a softening point of 100° C., polyvinyl acetal, with a softening point of 110° C., polyester, with a softening point of 100 to 160° C., polycarbonate, with a softening point of 132 to 137° C., polyarylate, with a softening point of 95 to 180° C., ethyl cellulose, methyl cellulose, polyvinyl alcohol and polyvinyl butyral, which softening points are determined by the JIS K2531 ring-and-ball test.

Examples of materials to form a non-softening resin layer include nitrocellulose and polyparabanic acid.

In short, any resin can be used, as long as it has a softening point higher than that of the heat softening colorant layers or has no softening point, and as long as it does not dissolve in the solvent used for the coating composition for the heat softening colorant layers.

In the present invention, the high softening point resin layer or non-softening resin layer is porous or island-like.

Being porous or island-like means herein that the ratio of coverage of the surface of the heat softening colorant layer located below the high softening point resin layer or non-softening resin layer in the heat softening colorant layers is 20 to 80%, preferably 30 to 70%. The porous or island-like form of the resin layer can be observed by a microscope. The coverage of the resin layer is calculated from the area of the resin layer occupied on the predetermined surface are of the heat softening colorant layer, these areas are determined on a microphotograph of the resin layer-coated surface.

To make this high softening point resin layer or non-softening resin layer porous or island-like, various methods can be used with no limitation. Examples thereof include (1) the method in which the high softening point resin or non-softening resin is dissolved in a solvent, and this solution is applied thin and dried to a final thickness of 0.2 $\mu$m or less on a heat softening colorant layer, whereby a porous or island-like resin layer is formed depending on the surface ruggedness of the heat softening colorant layer, (2) the method in which the resin is dissolved in a mixture of a bad solvent and good solvent therefor, and this solution is applied and dried, whereby a porous resin layer is formed depending on the difference between evaporation rates of the solvents, and (3) the method in which the resin is dispersed in an insoluble dispersant, and the resulting dispersion is applied and dried, whereby a resin layer comprising an island-like resin film is formed.

Furthermore, there is no problem with respect to adhesion of the heat softening colorant layer to transferee medium even when the resin layer is formed by a non-softening resin, since the resin layer has a shape of porous or island-like.

With respect to which type of polymer to use and at which concentration to obtain a porous or island-like high softening point resin layer or non-softening resin layer, conditions are empirically settled as appropriate.

The shape of the high softening point resin layer or non-softening resin layer may depend on the manner that the heat softening colorant layers are prepared.

Although the thickness of the high softening point resin layer or non-softening resin layer between the heat softening colorant layers cannot be generally specified because it depends on the configuration of the heat softening colorant layers and that of the high softening point resin layer or non-softening resin layer described above, it is normally 0.1 to 0.8 $\mu$m.

If the thickness of the high softening point resin layer or non-softening resin layer falls out of the thickness range described above, these resin layers can fail to be formed porous or island-like.

The heat softening colorant layers incorporating the high softening point resin layer or non-softening resin layer can be coated by hot melt coating, aqueous coating, coating using an organic solvent- and other coating methods.

The number, thickness and shape of the resin layers described above vary depending on the kind of the high softening point resin layer or non-softening resin layer described above, the configuration of the heat softening colorant layers described above and other factors.

Support

It is desirable that the support for the thermal transfer recording medium of the invention be highly resistant to heat and have high dimensional stability.

Examples of materials therefor include papers such as ordinary paper, condenser paper, laminated paper and coated paper; resin films such as those of polyethylene, polyethylene terephthalate, polysulfone, polystyrene, polypropylene and polyimide; paper-resin film complexes; and metal sheets such as aluminum foil; these materials can all be suitably used.

The thickness of the support is normally below 30 $\mu$m, preferably between 2 and 30 $\mu$m.

The thermal transfer recording medium of the present invention affords any configuration of the back face of the support; for example, a backing layer such as an anti-sticking layer may be formed thereon.

Embodiment of thermal transfer recording medium

In the method of preparing the thermal transfer recording medium of the invent-ion, a first heat softening colorant layer is formed by applying and drying a composition for heat softening colorant layer on the support, then applying and drying a composition for high softening point resin layer on the surface of the first heat softening colorant layer to form a high porous or island-like softening point resin layer, and subsequently applying and drying a composition of second heat softening colorant layer having the same composition as, or a different composition from, the composition for the first heat softening colorant layer on the surface of the high softening point resin layer.

A thermal transfer recording medium is thus obtained, which has one high softening point resin layer between heat softening colorant layers.

For a plurality of high softening point resin layers present between heat softening colorant layers, it is possible to form heat softening colorant layers having any number of high softening point resin layers by repeating the process wherein heat softening colorant layers are formed by applying and drying a composition for heat softening colorant layer on the support to form a heat softening colorant layer, then applying and drying a composition for high softening point resin layer on the surface of the heat softening colorant layer to form a porous or island-like high softening point resin layer, and subsequently applying and drying a composition for heat softening colorant layer having the same composition as, or a different composition from, the composition for heat softening colorant layer described above on the surface of the high softening point resin layer to form another heat softening colorant layer.

If a non-softening resin layer is to be present in place of a high softening point resin layer, it can be achieved in accordance with the method described above.

The thermal transfer recording medium thus obtained is subjected to surface smoothing treatment as desired and then cut into desired shape.

The thermal transfer recording medium of the invention involves no limitation as to mode of its use, but it is often used in the form of a wide tape for line printers, a typewriter ribbon or the like.

The thermal transfer recording medium of the invention is described in detail by means of the drawings. FIG. 1 is a cross-sectional view of a thermal transfer recording medium wherein two resin layers are each interposed between heat softening colorant layers.

On the support 1 are arranged a first heat softening colorant layer 2, a first high softening point resin layer 3, a second heat softening colorant layer 4, a second high softening point resin layer 5 and a third heat softening colorant layer 6.

By the number 10 is denoted an anti-sticking layer.

Figure 2:
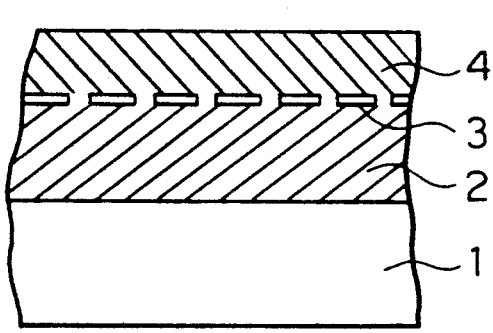

FIG. 2 is a cross-sectional view of a thermal transfer recording medium wherein one resin layer is present between heat softening colorant layers.

On the support 1 are arranged a first heat softening colorant layer 2, a first high softening point resin layer and a second heat softening colorant layer 4.

The method of thermal transfer using such a thermal transfer recording medium, essentially identical to the ordinary method of thermal transfer recording, is hereinafter described for the case where a line printer thermal head is used as the heat source.

Figure 3:
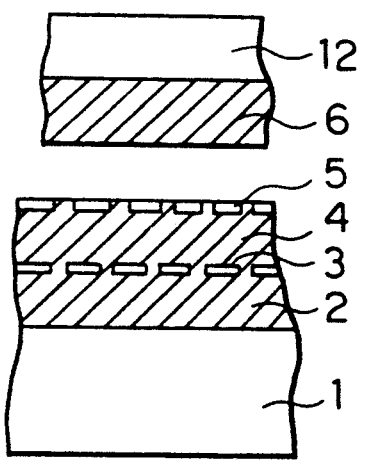
FIGS. 3, 4 and 5 are schematic diagrams showing the state of setting by the thermal transfer recording medium.

As illustrated in FIG. 3, the heat softening colorant layer of the thermal transfer recording medium is first brought into contact with a transferee medium 12 such as ordinary paper, and a heat pulse is applied by means of a thermal head to locally heat the portion of thermal transfer recording medium corresponding to the desired setting or transfer pattern while pressurizing with a platen from back of the transferee medium 12 where necessary.

Of the heated portion of the thermal transfer recording medium, the outermost heat softening colorant layer corresponding to the transfer pattern, i.e., the third heat softening colorant layer 6, softens quickly upon rise in its temperature and thus its adhesion with the second high softening point resin layer 5 weakens, which results in good interfacial peeling on the second high softening point resin layer 5 and transfer onto the transferee medium 12.

In the second setting, since the outermost layer of the thermal transfer recording medium is the second high softening point resin layer 5, the surface of the transferee medium 12 is not stained even when the thermal transfer recording medium is slid on the transferee medium 12.

In the second setting and thereafter, when heating is carried out in the same manner as above using the thermal head described above, the second heat softening colorant layer 4, located under the outermost second high softening point resin layer 5, is quickly heated and softened. The softened second colorant layer can be easily adhered to the transferee medium because of the resin layer 5 is porous or island-like.

Thus, the second heat softening colorant layer 4 becomes weaker in adhesion with the first high softening point resin layer 3, located thereunder, which results in good interfacial peeling on the first high softening point resin layer 3 and transfer onto the transferee medium 12.

Figure 4:
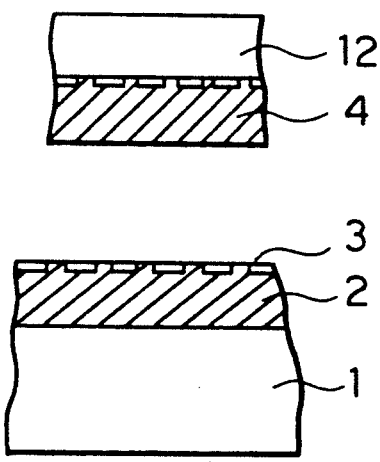

In this case, the second heat softening colorant layer 4 maintains good adhesion, since it is brought into direct contact with the transferee medium 12 via the pores or islands of the second high softening point resin layer 5 (see FIG. 4).

Moreover, in the third setting, since the outermost layer is the first high softening point resin layer 3, the surface of the transferee medium 12 is not stained even when the thermal transfer recording medium is slid on the transferee medium 12.

Figure 5:
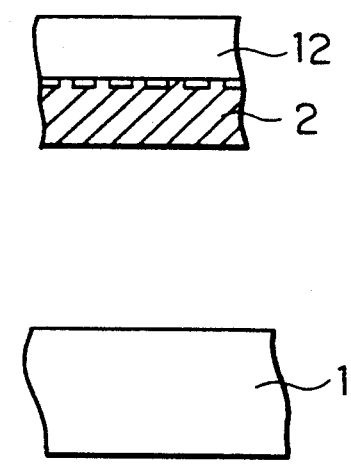

In the third setting also, the first high softening point resin layer 3 heated by the thermal head described above in the same manner as above is transferred onto the transferee medium 12 along with the first heat softening colorant layer 2, located thereunder (see FIG. 5).

In the thermal transfer recording medium of the invention, the adhesion of colorant layer with the transferee medium and adhesion between colorant layers can be appropriately designed on the basis of controlling the area covered by the high softening point resin layer or non-softening resin layer since these resin layers has the shape of porous or island-like.

The heat softening colorant layers partitioned by the high softening point resin layer or non-softening resin layer in the thermal transfer recording medium of the invention may be heat softening colorant layers with the same composition or heat softening colorant layers with different compositions.

EXAMPLES

The present invention is described in more detail by means of the following examples with reference to the drawings.

EXAMPLE 1

As illustrated in FIG. 1, heat softening colorant layers having two high softening point resin layers were formed on the surface of a polyethylene terephthalate film support 1 of 6 μm in thickness having an anti-sticking layer 10 on the back.

Specifically, a first heat softening colorant layer of 3 μm in thickness and a porous high softening point resin layer of 0.3 to 0.4 μm in thickness and 60% in coverage were formed on the surface of the support by applying and drying a coating composition for heat softening colorant layer having the composition shown below and subsequently applying and drying a composition for high softening point resin layer having the composition shown below.

Next, a second heat softening colorant layer of 3 μm in thickness was formed by applying and drying the coating composition for heat softening colorant layer on the surface of the first high softening point resin layer.

Furthermore, a second high softening point resin layer of 0.3 to 0.4 μm in thickness and 60% in coverage was formed by applying and drying a coating composition for high softening point resin layer on the surface of the second heat softening colorant layer.

Furthermore, a third heat softening colorant layer of 3 μm in thickness was formed by applying and drying the coating composition for heat softening colorant layer on the surface of the second high softening point resin layer.

| Coating composition for heat softening colorant layer | |
| --- | --- |
| Carbon black | 20 parts by weight |
| Paraffin wax, HNP-3, product of Nippon Seiro K.K., with a melting | 55 parts by weight |

| -continued | |
| --- | --- |
| Coating composition for heat softening colorant layer | |
| point of 65° C. | |
| Carnauba wax | 15 parts by weight |
| Ethylene-vinyl acetate copolymer, EV40LX, product of Mitsui du-Pont | 10 parts by weight |

The solvent used was methyl ethyl ketone and the coating composition had a solid content of 25%.

| Coating composition for high softening point resin layer | |
| --- | --- |
| Polyamide resin, Sunmide 611, product of Sanwa Chemical Industry Co., Ltd., with a softening point of 110° C. | 10 parts by weight |
| Isopropyl alcohol-water mixed solvent (8:2) | 90 parts by weight |

The thermal transfer recording medium thus obtained was applied to a thermal printer (260 mm wide line head, 180 DPI, platen rubber hardness 40°) and printing on ordinary paper was carried out in three cycles.

Observation of the printing images obtained in the second and third settings revealed the absence of ghosts, blurs and other failures.

COMPARATIVE EXAMPLE 1

A sample for Comparative Example 1 was prepared in the same manner as in Example 1 except that a single solvent of isopropyl alcohol was used in place of the isopropyl alcohol-water mixed solvent for the coating composition for high softening point resin layer used in Example 1 above. The sample thus obtained was found to have a pore-free uniform resin layer. This sample was subjected to a printing test in the same manner as in Example 1; printing images obtained in the second setting were found to be poor in adhesion to paper and involve blurred characters.

EXAMPLE 2

As illustrated in FIG. 2, a heat softening colorant layer having one high softening point resin layer was formed on the surface of a polyethylene terephthalate film support 1 of 4.5 μm in thickness on the back as follows.

Specifically, a first heat softening colorant layer of 5 μm in thickness and an island-like high softening point resin layer of 0.1 to 0.2 μm in thickness and 45% in coverage were formed on the surface of a support by applying and drying a coating composition for first heat softening colorant layer having the composition shown below and subsequently applying and drying a coating composition for high softening point resin layer having the composition shown below.

Next, a second heat softening colorant layer of 3 μm in thickness was formed by applying and drying a coating composition for second heat softening colorant layer having the composition shown below on the surface of the first high softening point resin layer.

| Coating composition for first heat softening colorant layer | |
| --- | --- |
| Carbon black | 20 parts by weight |
| Wax, HNP-11, product of Nippon Seiro K.K., with a melting point of 68° C. | 63 parts by weight |
| Ethylene-vinyl acetate copolymer, EV40Y, product of Mitsui du-Pont | 7 parts by weight |

| Coating composition for first heat softening colorant layer | |
| --- | --- |
| Carnauba wax | 10 parts by weight |

The solvent used was methyl ethyl ketone and the coating composition had a solid content of 30%.

| Coating composition for second softening point resin layer | |
| --- | --- |
| Carbon black | 20 parts by weight |
| Wax, HNP-11, product of Nippon Seiro K.K. | 67 parts by weight |
| Ethylene-vinyl acetate copolymer, EV40Y, product of Mitsui du-Pont | 3 parts by weight |
| Carnauba wax | 10 parts by weight |

The solvent used was methyl ethyl ketone and the coating composition had a solid content of 25%.

| Coating composition for high softening point resin layer A dispersion comprising the following composition: | |
| --- | --- |
| Ethylene-acrylic acid copolymer, Zaikthene, product of Sumitomo Seika K.K., with a softening point of 100° C. | 10 parts by weight |
| Water | 90 parts by weight |

The thermal transfer recording medium thus obtained was subjected to a printing test in the same manner as in Example 1.

Observation of the printing images obtained in the second setting revealed the absence of ghosts, blurs and other failures.

COMPARATIVE EXAMPLE 2

A sample for Comparative Example 2 was prepared in the same manner as in Example 2 except that the coating amount of the coating composition for high softening point resin layer was increased so that the thickness of the resin layer became 1.0 μm, and the coverage of the layer was 96%. A continuous uniform resin layer was formed since the coating amount of the coating composition for high softening point resin layer was increased. The sample thus obtained was subjected to a printing test in the same manner as in Example 1; printing images obtained in the second setting were found to be poor in transfer to paper and involve blurs.

What is claimed is:

1. A thermal transfer recording medium for multiple printing comprising,
    a support and, provided thereon,
    a first heat softening colorant layer,
    a first porous or discontinuous resin layer on said first colorant layer and,
    a second heat softening colorant layer on said first resin layer,
    wherein said first resin layer has a softening point not lower than 95° C. and higher than those of first and second colorant layers or has no softening point, and said first resin layer covers 20% to 80% of the surface area of said first colorant layer.

2. The recording medium of claim 1 further comprising a second porous or discontinuous resin layer on said second colorant layer and a third heat softening colorant layer on said second resin layer, wherein said second resin layer has a softening point higher than those of said first, second, and third colorant layers or has no softening point.

3. The recording medium of claim 1 wherein the thickness of said first porous or discontinuous resin layer is within the range of 0.1 μm to 0.8 μm.

4. The recording medium of claim 1 wherein said porous or discontinuous resin layer covers 30% to 70% of the surface area of said heat softening colorant layer provided at the position closer to said support.

5. The recording medium of claim 1, wherein said porous or discontinuous resin layer having higher softening point comprises a polyamide resin, an ethylene-acryl copolymer resin, a polyvinylacetal resin, a polyester resin, a polycarbonate resin, a polyarylate resin, an ethyl cellulose, a methyl cellulose, a polyvinyl alcohol or a polyvinylbutyral.

6. The recording medium of claim 1, wherein said porous or discontinuous resin layer having no softening point comprises a nitrocellulose or a polyparabanic acid.

* * * * *